May 5, 1964 K. B. MAGLEBY 3,132,259

PULSE SHAPER USING CARRIER STORAGE DIODES

Filed Oct. 18, 1960

INVENTOR
KAY B. MAGLEBY
BY J. C. Chognard
ATTORNEY

United States Patent Office 3,132,259

Patented May 5, 1964

3,132,259

PULSE SHAPER USING CARRIER STORAGE DIODES

Kay B. Magleby, San Jose, Calif., assignor to Hewlett-Packard Company, Palo Alto, Calif., a corporation of California Filed Oct. 18, 1960, Ser. No. 63,427
2 Claims. (Cl. 307—88.5)

Figure 1:
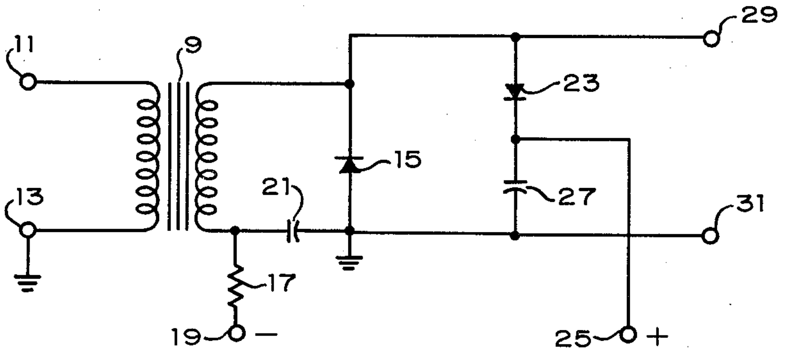

This invention relates to pulse shaping circuits and more particularly to a circuit for shortening the rise and fall times of an applied pulse.

Sharp electrical pulses are essential for the accuracy of digital devices and radar systems. Several methods have been used in the past to obtain pulses having very short rise times. One method used is the charging and discharging of a predetermined length of transmission line by mechanical switching means. This provides pulses of finite duration and low repetition rate which have rise times of the order of one to ten millimicroseconds. Where the rise time of pulses obtained by other means is not sufficiently short, pulse shaping circuits have been used to provide rise times of the order of one millimicrosecond. (See Lewis and Wells: "Millimicrosecond Pulse Techniques," Chapter 4, Pergamon Press, New York, 1959.)

There are applications, however, where the pulses obtained by using the transmission-line type generator or shaper is inadequate, such as where sharp pulses of controllable duration and repetition rate are required which have rise and fall times of the order of a fraction of a millimicrosecond.

High speed digital computers, for example, require sharp pulses in order to perform logic operations accurately and in rapid succession. In these digital devices, the logic operations are generally carried out by applying pulses to combinations of switching elements. These elements generally operate only in either one of two states which correspond to maximum and minimum levels of applied pulses. The maximum level of the applied pulses, then, should be developed from a minimum or reference level in as short a rise time as possible, ideally in zero time. Relatively slow rise-time pulses provide continuously changing intermediate pulse levels which increase the probability of error. For similar reasons, then, the fall time of applied pulses should be as short as possible. Such slow rise time pulses thus effectively limit the speed at which the logic operations can be performed. Since the speed at which a digital computer operates is of prime importance in many applications, it is essential to apply to the switching elements pulses which have very short rise and fall times.

Accordingly, it is an object of the present invention to provide a pulse shaping circuit which will provide pulses having rise and fall times of the order of a fraction of a millimicrosecond from pulses produced by conventional means.

It is another object of the present invention to provide a simple and inexpensive circuit which will produce rectangular pulses having sharp leading and trailing edges in response to applied pulses.

This invention makes use of the discovered phenomenon of discontinuity in the reverse conduction current of certain graded junction diodes to shape the leading and trailing edges of an applied pulse. The discontinuity in the reverse conduction of these diodes occurs when the supply of carriers stored in the vicinity of the junction during forward conduction is suddenly depleted. The discontinuity appears as a very fast rate of change of reverse current which is much faster, in fact, than the rate of change of the current applied to the diode.

Figure 2:
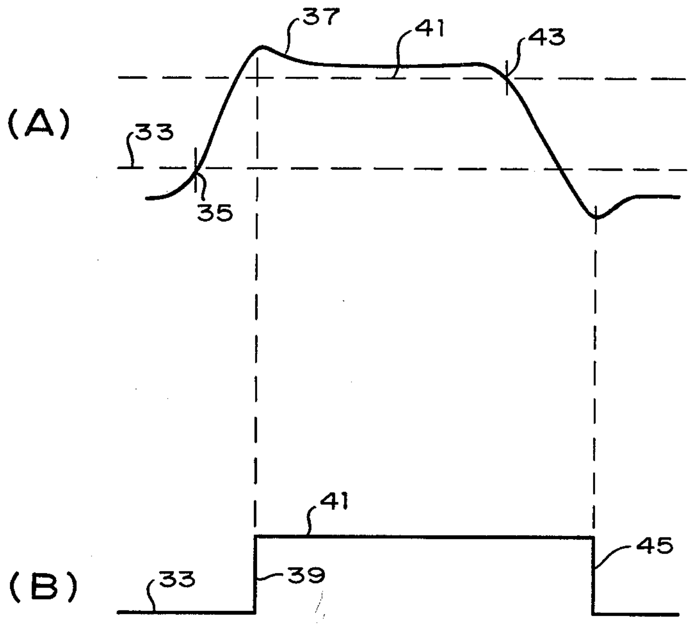

Other and incidental objects of the present invention will be apparent from a reading of this specification and an inspection of the accompanying drawing in which:

FIGURE 1 is a schematic diagram of a circuit in accordance with an embodiment of the present invention, and FIGURE 2 is a graph showing the relationship between an applied pulse and the output pulse produced by the circuit of FIGURE 1.

Referring now to FIGURE 1, there is shown a transformer 9 with input terminal 11 and grounded terminal 13. Grounded diode 15 is connected through the secondary winding of transformer 9 and through resistor 17 to a source of negative potential 19. Capacitor 21 connects the common terminal of resistor 17 and the secondary winding of transformer 9 to ground. Diode 23 connects the common terminal of serially connected secondary winding of transformer 9 and diode 15 and a positive source of potential 25. Capacitor 27 is connected between the positive source of potential and ground. Output terminal 29 is connected to the common terminal of serially connected diodes 15 and 23 and output terminal 31 is connected to ground.

In operation, diode 15 is initially forward biased by the negative supply voltage 19 applied to the diode through resistor 17 and the secondary winding of transformer 9. Diode 23, which is elevated above ground by a voltage that is equal to the forward voltage drop across diode 15, is back-biased by the positive supply voltage 25. The voltage that initially appears, then, at the output terminals 29 and 31 is equal to the forward voltage drop of diode 15.

Signal applied to input terminals 11 and 13 is coupled through transformer 9 and capacitor 21 to the diode 15 with a polarity that tends to back-bias diode 15. Diode 15 is a diffused junction semiconductor device which has about its junction a gradient of impurity concentration that increases rapidly with distance from the junction. This type of diode is described in pending application No. 27,943, filed May 9, 1960, by Albert Frank Boff, et al., now abandoned. It is believed that these diodes store carriers in the vicinity immediately adjacent to the junction during forward conduction, and exhibit a sudden depletion of the stored carriers during the subsequent reverse conduction, which depletion occurs in the time considerably shorter than the carrier lifetime. Thus, diode 15 continues to conduct subsequent to the application of the back-biasing signal, which conduction continues until the supply of carriers stored in the vicinity of the junction during the forward conduction period is depleted. When all the stored carriers are depleted, a rapid transition from the conduction state to the non-conduction state occurs in a time that is considerably shorter than one millimicrosecond. The transition in the voltage across diode 15 appears at output terminals 29 and 31 as the leading edge of an output pulse.

Diode 23 serves to clamp the output voltage appearing at output terminals 29 and 31 to a value that is substantially equal to the positive supply voltage 25. Diode 23 is held in the forward conduction state by the signal applied thereto through transformer 9. Diode 23 is a diffused junction semiconductor device having conduction characteristics that are substantially similar to the characteristics of diode 15. Thus, during the forward conduction state of diode 23, carriers are being stored in the vicinity immediately adjacent to the junction.

When the signal applied through transformer 9 to diode 23 is no longer of sufficient amplitude to maintain forward conduction, diode 23 becomes back biased. However, diode conduction continues, as described for diode 15, until the supply of carriers stored in the immediate vicinity of the junction is suddenly depleted. When the carriers stored in the vicinity of the junction of diode 23 are depleted, a transition from the conduction state to the non-conduction state occurs in a time that is considerably shorter than one millimicrosecond. The resulting change in voltage across diode 23 appears as the trailing edge of an output pulse appearing at output terminals 29 and 31. The change in voltage across diode 23 also causes diode 15 to return to the conduction state, thereby clamping the voltage appearing at output terminals 29 and 31 to a value that is equal to the forward conduction voltage drop of diode 15.

Other circuits using this type of diode may be used to produce an output pulse having very fast rise and fall times. In general, one diode may be used to produce the rise time, and another diode may be used to produce the fall time of an output pulse. This may be accomplished in a circuit which provides forward conduction current for one diode in the absence of an input pulse, and which permits the input pulse to be applied to the one diode with sufficient amplitude and polarity to oppose the flow of forward conduction current. When the supply of carriers is stored during forward conduction in the immediate vicinity of the diode junction is suddenly depleted, the sharp transition or fast rise time in the output pulse occurs. The circuit should similarly provide the other diode with forward conduction current during the presence of the applied pulse. The said other diode is then able to produce the sharp transition of fast fall time in the output pulse subsequent to the removal of the applied pulse. In addition, a circuit comprising a single diode of the type previously described may be used to shape either the leading or trailing edge of an applied pulse when only one sharp pulse edge is required.

Referring now to FIGURE 2, a typical input waveform is shown in FIGURE 2A. Voltage level 33 is equal to the forward conduction voltage drop of diode 15. The input waveform 37 which is applied through transformer 9 and capacitor 21 to diode 15, tends to back-bias the diode when the waveform level 35 is substantially equal to the forward voltage drop of diode 15. However, the diode 15 continues to conduct until the supply of carriers stored during forward conduction is suddenly depleted. The delay between the time when diode 15 becomes back biased and the subsequent initiation 39 of an output pulse (when diode 15 ceases conducting) is determined primarily by the initial diode forward conduction current and by the diode characteristics.

At the instant when diode 15 becomes non-conducting, diode 23 becomes forward-biased and clamps the output voltage appearing between terminal 29 and 31 to a value 41 that is substantially equal to the positive supply voltage 25. Diode 23 begins to store charge in the vicinity immediately adjacent to its junction subsequent to the initiation 39 of an output pulse. At the instant when the level of the applied waveform reduces to a value 43 that is substantially equal to the amplitude 41 of the output pulse, diode 23 becomes back-biased. However, diode 23 continues to conduct until the supply of carriers stored in the vicinity immediately adjacent to the junction is depleted. When the supply of carriers stored in diode 23 is depleted, diode 23 turns off, thereby terminating the pulse 45 appearing at output terminals 29 and 31. At the same time, diode 15 is again turned on. The voltage that subsequently appears at output terminals 29 and 31 is again substantially equal to the forward conduction voltage drop of diode 15.

Therefore, the pulse shaper of the present invention provides economical means to improve the rise and fall times of applied pulses. The relatively simple circuit of the present invention makes use of the observed switching characteristic of specially graded junction diodes to provide rise and fall times of output pulses that are considerably shorter than one millimicrosecond.

I claim:

1. Pulse shaping apparatus having an input and an output and comprising:

first and second semiconductor diodes, each having a P-N junction therein and each being capable of storing electrical carriers injected into the region about the junction during forward conduction of current therethrough;

a bias supply connected to the first diode for supplying forward conduction current thereto;

circuit means connecting said input to the first diode for applying a pulse to be shaped thereto with sufficient amplitude and polarity to oppose forward conduction current through the first diode;

a first circuit including the first diode connected to said output for initiating an output pulse at said output in response to the depletion of injected carriers in the first diode after the rise time of the pulse to be shaped;

a second circuit including the second diode connected to said output for applying said output pulse to the second diode with sufficient amplitude and polarity to supply forward conduction current therethrough; and another bias supply connected to the second diode for supplying reverse conduction current therethrough to remove injected carriers from said diode;

said second circuit including the second diode terminating the output pulse in response to the depletion of injected carriers in the second diode following removal of the pulse to be shaped.

2. Pulse shaping apparatus having an input and an output and comprising:

serially-connected first and second semiconductor diodes, each having a P-N junction therein and each being capable of storing for periods longer than the rise or fall times of pulses applied thereto electrical carriers injected into the region about the junction during forward conduction of current therethrough;

a bias supply connected to the first diode for supplying forward conduction current thereto;

a circuit including a transformer connecting the input to the common terminal of the first and second diodes and the remaining terminal of the first diode for applying a pulse to be shaped thereto with sufficient amplitude and polarity to oppose forward conduction current through the first diode;

a first circuit including the first diode connected to said output for initiating an output pulse at said output in response to the depletion of injected carriers in the first diode after the rise time of the pulse to be shaped;

a second circuit including the second diode connected to said output for applying said output pulse to the second diode in the forward current-conducting direction; and another bias supply connected to the second diode for supplying reverse conduction current therethrough to remove injected carriers from said diode;

said second circuit including the second diode terminating the output pulse in response to the depletion of injected carriers in the second diode following removal of the pulse to be shaped.

References Cited in the file of this patent

UNITED STATES PATENTS

| | | |
|---|---|---|
| 2,976,429 | Abbott et al. | Mar. 21, 1961 |
| 3,020,420 | Smee | Feb. 6, 1962 |
| 3,070,779 | Logue | Dec. 25, 1962 |

OTHER REFERENCES

Hunter: "Handbook of Semiconductor Electronics," McGraw-Hill Co., Inc., 1956 (sect. 4.5, pages 4–20 to 4–26 relied upon).

"Pulse and Digital Circuits," McGraw-Hill, 1956, Millman and Taub, page 116, FIG. 4–10 relied on.

U.S. Semiconductor Products Inc., bulletin "Diffused Silicon Diodes," by Franklin R. Carlson, received December 1959.